(12) United States Patent
Sane et al.

(10) Patent No.: US 7,709,971 B2
(45) Date of Patent: May 4, 2010

(54) LINEAR WIND-POWERED ELECTRIC GENERATOR

(76) Inventors: Shrikrishna Sane, 601, Shivneri, IIT Bombay Staff CHSI, Kopri, Powai (IN) 400076; Nirmal Muyle, 10 Erin Ct., Kendal Park, NJ (US) 08824; Vijay Shukla, 184 Cedar La., Apartment A, Highland Park, NJ (US) 08904; Osanan L. Barros Neto, 465 Meadow Rd., Apartment 1102, Princeton, NJ (US) 08540

( * ) Notice: Subject to any disclaimer, the term of this patent is extended or adjusted under 35 U.S.C. 154(b) by 66 days.

(21) Appl. No.: 12/190,970

(22) Filed: Aug. 13, 2008

(65) Prior Publication Data

US 2009/0045634 A1 Feb. 19, 2009

(51) Int. Cl.
*F03B 13/10* (2006.01)

(52) U.S. Cl. .............................. 290/43; 290/44; 290/54; 290/55

(58) Field of Classification Search .................... 290/55, 290/44, 43, 54
See application file for complete search history.

(56) References Cited

U.S. PATENT DOCUMENTS

| | | | |
|---|---|---|---|
| 3,730,643 A | 5/1973 | Davison | |
| 4,114,046 A | 9/1978 | Yousef | |
| 4,180,367 A | 12/1979 | Drees | |
| 4,218,183 A | 8/1980 | Dall-Winther | |
| 4,302,684 A | 11/1981 | Gogins | |
| 4,720,646 A * | 1/1988 | Torimoto | 310/71 |
| 5,730,643 A | 3/1998 | Bartlett et al. | |
| 5,758,911 A | 6/1998 | Gerhardt | |
| 6,672,522 B2 | 1/2004 | Lee et al. | |
| 7,215,036 B1 * | 5/2007 | Gehring | 290/54 |
| 7,360,995 B2 | 4/2008 | Suzuki | |
| 2004/0080166 A1 | 4/2004 | Davidson | |
| 2004/0164562 A1 | 8/2004 | Latyshev | |

OTHER PUBLICATIONS

Sane, et al., "A Novel Linear Windmill Concept and Design", Proceedings of the 1st National Conference on Advances in Energy Research, Energy Systems Engineering Indian Institute of Technology, Bombay (2006).

\* cited by examiner

*Primary Examiner*—T C Patel
*Assistant Examiner*—Iraj A Mohandesi
(74) *Attorney, Agent, or Firm*—Scully, Scott, Murphy & Presser, P.C.

(57) ABSTRACT

A linear wind powered electric generator (LWPEG), which is particularly adapted for installation at geographical sites subject to lower wind intensities. More specifically, there are provided design concepts for an LWPEG, possessing reasonable economic parameters for utilization at the lower-intensity wind sites. Moreover, the linear wind powered electric generator is based on a track based wind power generator, incorporating aerodynamic designs, which are adapted to reduce mechanical complexities presently encountered in this technology, while being cost-effective both in construction and in connection with the operation thereof.

31 Claims, 7 Drawing Sheets

LINEAR WIND-POWERED ELECTRIC GENERATOR

BACKGROUND OF THE INVENTION

1. Field of the Invention

The present invention relates to a novel linear wind powered electric generator (LWPEG), which is particularly adapted for installation at geographical sites subject to lower wind intensities. More specifically, the invention is directed to the provision of a track based design concept for an LWPEG, possessing reasonable economic parameters for utilization at the lower-intensity wind sites. Moreover, the linear wind powered electric generator is based on a track based wind power generator, incorporating aerodynamic designs, which are adapted to reduce mechanical complexities presently encountered in this technology, while being cost-effective both in construction and in connection with the operation thereof.

The concept of windmills has been proposed over a considerable period of time for harnessing the power of the wind, in the form of wind turbines generating electrical energy. Wind power provides a plentiful, renewable, geographically widely distributed, clean source of energy, while concurrently ameliorating the danger of generating deleterious by-products and greenhouse gas emissions, by replacing fossil fuel-derived electricity.

Wind energy, which is similar to solar energy in representing a clean form of renewable energy, can be exploited for generating viable electrical power and is becoming more and more economically and environmentally relevant. In this technology, there are currently known many diverse essentially conventional axis-based windmill or turbine designs operating with horizontal (wind) axes, and others functioning with vertical (cross) axes.

Measured on a worldwide scale, the geographically available wind energy resources are immense, and are potentially capable of satisfying all current energy needs of mankind several times over. However, unfortunately, wind energy is not available universally in equal wind intensities. Based upon so-called energy density, wind intensities are classified into seven general classes, with the 7$^{th}$ class being identified as being the strongest and the 1$^{st}$ class as being the weakest. Thus, wind density in a country, for example, such as India, is very poor compared with that available, for instance, in North America and Northern Europe, wherein all current wind turbine designs are rated for a Class 6 wind density, which was defined as a reference wind regime by the United States of America in the mid-1980s. In this connection, the annual energy available for the Class 6 wind density is about 5200 kWh/year/m$^2$, and reduces for a Class 2 wind density to about 1200 kWh/year/m$^2$ at a height of 50 m above ground level.

Generally, large expanses in area have been identified as Class 2 wind sites, i.e., possessing a wind power density of 1200 kWh/year/m$^2$ at 50 m above ground levels. Thus, for example, official data for India alone indicates that nearly 89% of installable wind power capacity here is at the low Class 2 wind density. Horizontal axis wind turbine (HAWT) technology, as presently employed, is deemed inappropriate for Class 2 wind density sites. Consequently, in order for low wind energy having to significantly contribute within the next or future decades, installations imbued with good operating economics under Class 2 wind density conditions are required. Such installations must afford a substantially higher annual energy extraction under prevailing annual wind velocity distributions when compared to HAWTs, such as the linear wind powered electric generator (LWPEG) contemplated by the present invention.

Pursuant to the current state of the art, over 95% of current wind turbine designs are three-bladed or two-propeller-type horizontal axis wind turbines (HAWT) whereas vertical axis wind turbines (VAWT) are normally considered for stand-alone units possessing low power ratings, whereby also a few multi-bladed HAWT and split-drum type VAWTs are employed for water pumping purposes. Over 25 years ago, as mentioned, the United States Department of Energy and NASA defined Class 6 wind density as the reference wind regime for the United States, which is geographically close to the average wind resource of the United States. Currently, all major wind turbine manufacturers base their designs on Class 6 wind densities, which are slated to operate under Class 6 to Class 7 wind ranges. Special efforts have been made somewhat more recently to develop the so-called 'Low Speed Wind Technology', as referred to in Class 4 wind density whereby, in fact, winds of Class 3 and above are considered as an energy resource. Consequently, at this time, there are no competitive technological solutions available for Class 2 wind resources, with major wind turbine manufacturers, who developed their designs for Class 6 wind resources, making an attempt to market the designs for low-wind sites by either increasing the wind turbine hub height and rotor diameter at a higher cost, or by de-rating the design, again at a higher cost for energy.

Most of the presently installed wind turbine power, for example, in countries like India, is in HAWT designs and occupies Class 3 to Class 5 wind sites. However, it is noted that only about 10% of the wind energy potential is available in these wind intensity classes, with the remainder being in Class 2.The total wind energy potential in Class 3 to 5 winds adds up to about 5000 MW. Thus, if wind energy is to contribute substantially to power generation within the next decades, then it becomes necessary to be able to develop power generating designs with reasonable economic parameters for Class 2 wind sites.

2. The Prior Art

Although numerous windmills in the form of power-generating wind turbines are currently known, and are widely installed and operated at numerous sites in different countries and locales, these are primarily prevalent of the designs which are required for high-density wind applications, i.e., significantly higher than for Class 2 wind sites.

Thus, among publications of interest there may be considered the disclosures of U.S. Pat. No. 4,218,183, U.S. Pat. No. 7,360,995; U.S. Patent Publication No. 2004/164562; U.S. Pat. No. 4,302,684; U.S. Patent Publication No. 2004/080166; U.S. Pat. No. 6,672,522 B2; U.S. Pat. No. 5,758,911; U.S. Pat. No. 4,114,046 and U.S. Pat. No. 5,730,643.

There are represented two primary types of wind turbines, i.e., the widely employed horizontal axis wind turbine (HAWT) designs, and the somewhat less used vertical axis wind turbine (VAWT) design, whereby the horizontal axis wind turbine (HAWT) technology is clearly deemed to be inappropriate for Class 2 wind sites. Thus, installations with good operating economics under low-velocity winds, and which provide substantially higher annual energy extraction levels under local prevailing annual wind velocity distributions, when compared with presently available HAWTs and other designs must be developed.

In the above referenced prior art publications, there are disclosures which are concerned with vertical and horizontal axis wind power generating systems, as well as track-based, pulley-guided wind power generating systems with different complex combination of mechanical components, such as sails or the like, or which utilize earlier technologies that do not translate well into modern economies of scale. Further, the existing design concepts of wind power generating systems are only adapted for operation with higher-density classes of winds, and as such, are not readily capable of being utilized successfully, especially on commercial scales, for the low density Class 2 wind sites.

SUMMARY OF THE INVENTION

Accordingly, the present invention provides for an alternative and novel concept termed as "Linear Wind Powered Electric Generator", hereinafter designated as 'LWPEG', and which is based on a linear windmill, or turbine and linear electric generator design of unique configuration. Summarizing the foregoing, it can be ascertained that there is a need to explore new concepts, designs and technologies, which will operate efficiently at the low Class 2 wind speeds, (50 m AGL, wind speed: 5.6-6.4 m/s; wind power density: 200-300 W/m$^2$; Installable Power in India: 43106 MW, which is 8 times higher than all higher speed Classes 3, 4 and 5 combined). Heretofore, the major windmill technology developers have exclusively concentrated on designs for about Classes 5, 6 and 7 wind densities for economic reasons, whereby such wind conditions are not available in all countries, for example, such as India, among others. Thus, it is important to be able to provide installations satisfying this need. Hereby, previous concepts ordinarily use one axis, horizontal or vertical, around which 'lift' type blade elements rotate at the same angular speed, whereby the linear blade element speed varies essentially from zero at the center axis of rotation to a maximum value at the outermost radial blade location, the so-called blade tip speed in the conventional HAWT. The blade design is normally optimized to facilitate obtaining the best aerodynamic and structural performance, but the fact remains that blade elements very close to the center axis of rotation are aerodynamically ineffective, whereas those close to or at the blade tip produce considerable levels of noise due to high speeds and vortex shedding. The larger the unit power for a given wind class, the larger is the diameter, the taller is the tower, and more complex are the therewith associated structural problems. The designs with one axis of rotation are, however, very compact in configuration, especially the HAWT with just two or three blades.

Basically, all the aerodynamic disadvantage of lengthy blades rotating around a single center axis can be mitigated if a blade of constant or variable cross section is moved across the wind in a straight line, and by using the component of the lift force to move the blade and to thereby extract energy. However, for a continuous operation, the blade element must return back to its starting point, consequently, there is a need in the technology to develop a highly efficient, simple, cost-effectively competitive linear wind power-generating installation that is more specifically adapted for ultra-low Class 2 wind density sites, wherein the invention provides a significant advance in the field of wind power energy, designed to be predicated on a simple linear track-based arrangement.

A primary objective of the invention resides in developing a new and unique track-based aerodynamic wind turbine design for wind power generation, which is intended to compensate for the mechanical complexities of existing wind power electric generators.

Another objective of the present invention is to develop a highly efficient, cost effective track based linear wind power generator installation, which is particularly efficient for Class 2 low wind density sites.

According to the present invention a novel linear windmill or turbine configuration consists of a suitable number of blades or wings, of selectively suitable chord, airfoil section, span, planform shape, internal load bearing structure, and tip wing plates. The blades are adapted to move along an essentially continuous orbit of various shapes like oval or trapezoidal, but are not limited thereto. The blades or wings may be mounted on pylons, which arrange the former on a closed-loop track or on a conveyor, whereas wing-setting structures retain the blades or wings in predetermined orientations. In various embodiments, corner guide pulleys may hold the conveyor in pre-tension and mounted on a conveyor frame. Torque converter units (at least one), which are integral with the corner guide pulleys, may be adapted to mount devices, such as electric generators, air compressors or water pumps. A windmill base frame is connected with the structural frames, and may comprise a turntable that is free to be rotated around a vertical axis on a base foundation by using the torque provided by both a rudder weathercock vane and arm, or by means of external power.

Pursuant to an aspect of the present invention, the blades may be guided within rail guide tracks with conventional wheel-bearings or very recently available 'Straight-Curved Guide' system, while a wing-setting gear maintains the wings in predetermined orientations. Distributed linear permanent magnet and electric generating elements are mounted on the blades and/or are located within the rail guide tracks, whereby at least two essentially parallel-extending rail guide tracks form an integral guide-track-frame. A windmill base frame, such as a turntable, which is free to rotate the rail guide tracks and blades around a vertical axis on the base foundation, such as by using the torque provided by both a rudder weathercock vane and arm, or through external power. According to an embodiment of the present invention, the wing setting gear comprises endless guide tracks within which guide rollers mounting the blades or wings move smoothly.

According to a preferred embodiment of the present invention, the wing-setting-gear may comprise a self-contained active or passive blade or wing pitch-setting controller and actuator for an outboard wing span turning or outboard wing leading edge extender/retractor system.

The blades or wings, when mounted on pylons with end wheel bearings may be connected to each other only mechanically or electrically, or mechanically and electrically, so as to maintain their relative fixed positions, while the conveyor frame or the guide track frame are located in either vertical or horizontal orientations, but preferably in a vertical orientation.

Finally, pursuant to various embodiments of the present invention, electrical power or energy may be extracted at least at one support pulley by a rotary generator, or through a distributed permanent magnet linear generator, of either moving iron or moving magnet type, extending along the rail guide tracks.

According to the present invention, the blades or wings, while operating as lift elements, move in a substantially straight path across the freely-streaming wind, resulting in a significantly improved aerodynamic performance, and hence, in an enhanced degree of energy extraction from the wind in comparison with the prior art. The blades or wings must move several times (typically 3 to 6 times) faster than the speed of the wind to achieve the best aerodynamic performance, inasmuch as the rotating parts of the installations are subjected to inertial loads while turning around corners along the paths of travel. According to the present invention, such an operation is feasible in a practical mode at the very low or ultra-low wind speeds of Class 2.

BRIEF DESCRIPTION OF THE DRAWINGS

FIGS. 16 and 17 illustrate, respectively, side and front views of blade track path with FIG. 18 being a variant of the embodiment of FIG. 17;

DETAILED DESCRIPTION OF THE INVENTION

Basically, in general terms, the novel linear wind powered electric generator (LWPEG) according to the present invention is aerodynamically optimally designed for very low and ultra-low wind velocities, such as Class 2 wind intensity sites. The linear wind powered electric generators (LWPEG) as illustrated in the various embodiments of the present invention each comprise a suitable number of blades or wings of predetermined chord, airfoil section, span, planform shape, internal load bearing structure and tip wing-plate dimensions, and are made to travel along preferably non-circular orbits of various configurations, such as oval or trapezoidal, but are not limited to thereto. In that connection, the blades or wings functioning as lift elements move in a substantially straight path across a free streaming wind, resulting in a wind turbine effect with a significantly improved aerodynamic performance, and hence, an increased energy extraction from the wind. As the wings or blades must move several times (typically 3 to 6 times) faster than the wind speed in order to achieve best aerodynamic performance, the rotating or traveling elements are subjected to inertial loads while turning around the corners or orbital directions, whereby such an operation is in practice feasible at very low or ultra-low wind speeds at Class 2 wind densities or intensities.

Figure 1:
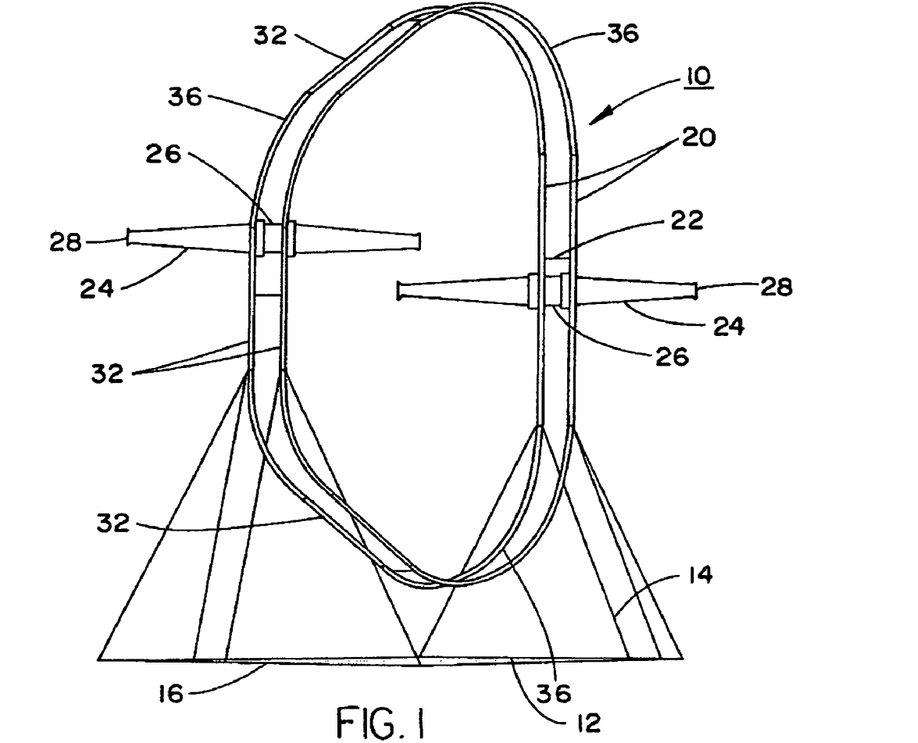
FIG. 1 illustrates, generally diagrammatically, a perspective view of a first embodiment of the linear wind-powered electric generator of the invention.

Referring to FIG. 1 of the drawings, represented is a diagrammatic illustration of a preferred embodiment of the 'LWPEG' 10, comprising a ground-supported frame 14 with freedom of yaw structure 12, which is mounted on a base support frame 16, and which hold a pair of spaced, parallel extending curved guide rail tracks 36 attached to each other by cross supports 22. A plurality of wing-like blades 24 each include a central wing section 26 and have (radially) outer wing end plates 28, which are mounted with the support of wing pylons 30 on straight sections 32 of the guide rail tracks 20, while including a linear power generator assembly (as illustrated in drawing FIGS. 2 and 3). Hereby, the wing-like blades 24 are caused to slide linearly along the guide rail track sections 32 to the maximum extent in order to utilize the maximum kinetic energy, resulting in a substantially high electromagnetic energy extraction, as elucidated hereinbelow.

As shown, the pair of guide rail tracks 20 include both the straight guide rail track sections 32 and curved guide rail track sections 36, forming closed loops. The guide track support frame 12 may be provided in either a preferably vertical, or in horizontal orientation, as may be required for specific operations or geographic applications.

Figure 2:
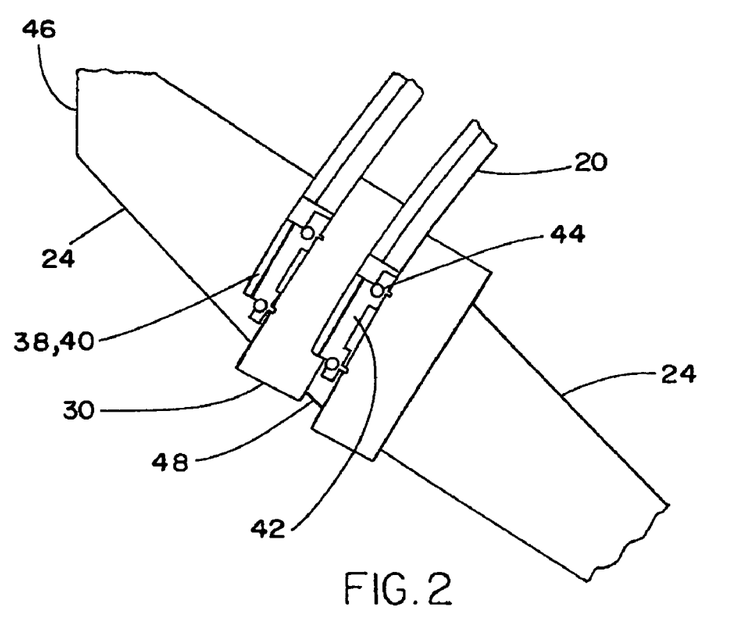
FIG. 2 illustrates a detailed representation of the wing mount and integral linear electric generator arrangement of FIG. 1.
Figure 3:
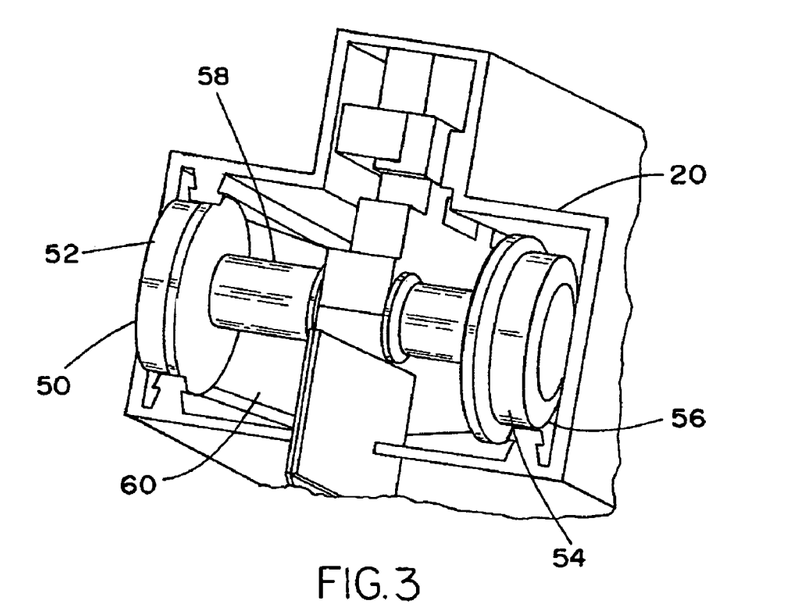
FIG. 3 illustrates an enlarged perspective sectional detail of a portion of the guide rail structure and elements of linear electric generator of FIG. 1.

FIG. 2 is a detailed view of a part of the 'LWPEG' 10, as illustrated in FIG. 1, such as a segment of the tracks 20. The linear generator assembly, as shown in FIG. 3, for electromagnetic power generation consists of a stator core 38, stator coils 40, rotor element 42, and wheel bearings 44. The wing-like blades 24 have wing side plates 46, and are mounted on the guide tracks 20, with the support of the pylons 30, which are covered with a wing pylon cover 48.

FIG. 3 is an enlarged and more detailed sectional view of the 'LWPEG', as shown in FIG. 2, comprising a segment of the guide rail track 20, including a wheel assembly 50 for the blades 20. The wheel assembly 50 includes two wheels 52, 54 fitted to roll within the guide rails 20, and having end wheel bearings 56, which are connected to each other through an axle 58. Two such axles are connected to each other either mechanically, electrically, or jointly mechanically and electrically, so as to maintain their relative fixed positions. A permanent magnet 60 is interposed between groups of stator coils 40. The linear generator rotor is connected to the wing pylons through the rotor core 42 and forms an air gap with the stator iron core 38. In order to effectuate power generation, relative motion is implemented between the stator and rotor elements responsive to the linear movement of blades 24 along guide rail track sections 32.

Figure 4:
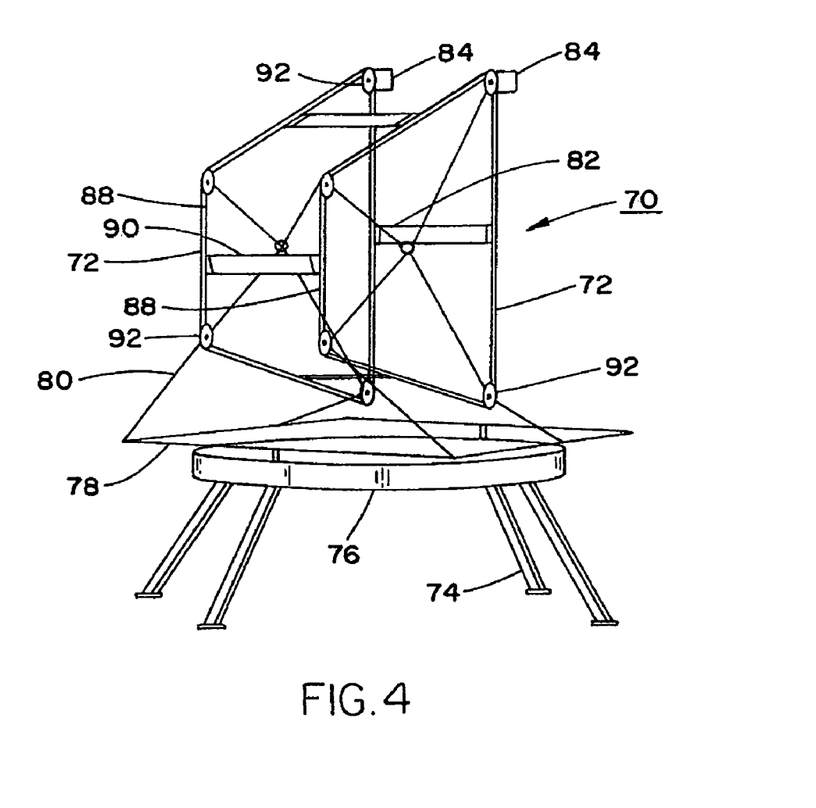
FIG. 4 illustrates, diagrammatically, another embodiment of the invention.

Referring to FIG. 4, there is provided a diagrammatic illustration of another LWPEG Embodiment 70. Provided in this case, are a pair of parallel relatively widely spaced tracks 72. A ground support structure 74 has a turntable 76 arranged thereon. A horizontal base frame 78 mounts a support frame 80 with vertical frames 82. Yaw control vanes 84 are supported from the vertical frames 82. The tracks 72 comprise conveyors 88, which include blades 90 extending therebetween. Corner pulleys 92 have the conveyors 88 entrained thereover, and with the pulleys importing the electromagnetic energy generators producing energy as the wind-dependent linear motions of the conveyors responsive to the displacement thereof by the wind impacted blades which are connected between the conveyors. This assembly shows the inventive arrangement being mounted on the turntable 76 for rotation of the installation about a vertical axis depending upon wind direction for optimum deployment thereof.

Figure 5:
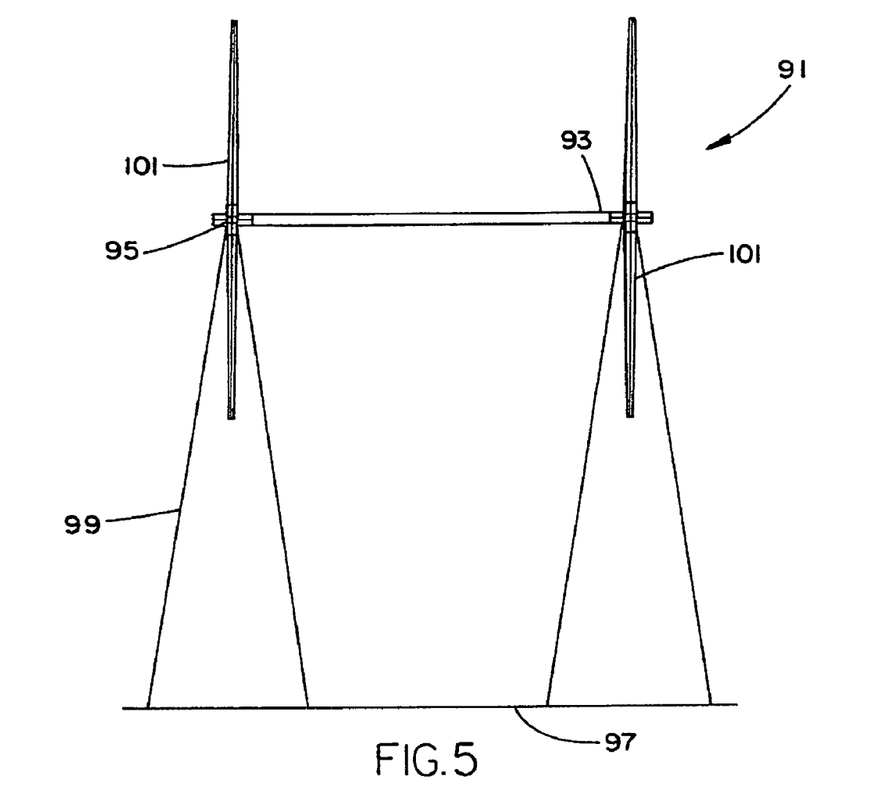
FIG. 5 illustrates, diagrammatically, another embodiment with a modified guide rail frame arrangement but oriented in a horizontal plane rather than vertical, according to the present invention.

FIG. 5 is a diagrammatic illustration of a 'LWPEG' 91 having a wing central support section 93, which is mounted on a rail guide track frame 95 that is oriented in the horizontal plane, and which is further supported by a ground frame 96 with freedom to yaw, and vertical support frames 99, suitable blades 101 may be mounted on the wing central support section 93, which is adapted to house the electromagnetic generator device, as previously described in FIG. 3.

Figure 6:
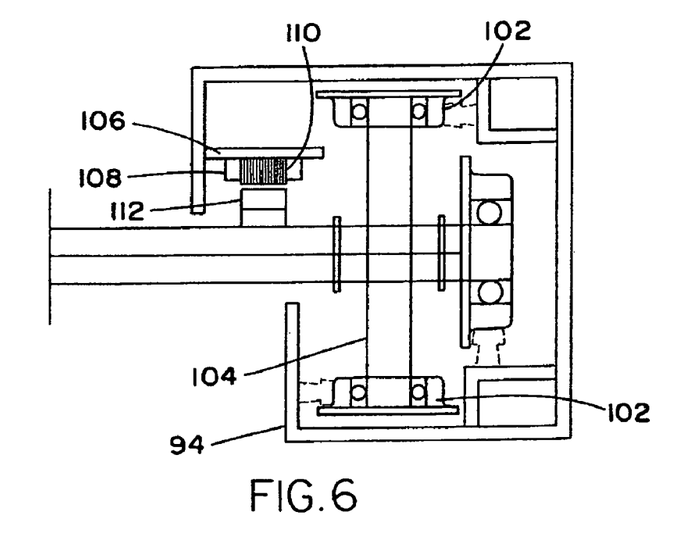
FIG. 6 illustrates, diagrammatically, on an enlarged scale, a sectional view of the guide rail frame of FIG. 5.

FIG. 6 is a diagrammatic illustration of the 'LWPEG', as illustrated in FIG. 5, in a view of the guide rail track cross-section, comprising wheel bearings 102, which is interconnected by a transverse support axle 104, and is guided on the rails of the guide rail track frame 94. The linear generator assembly consists of a generator stator iron 106, a permanent magnet 110, generator stator coils 110 108 and a generator rotor iron core 112.

Figure 7:
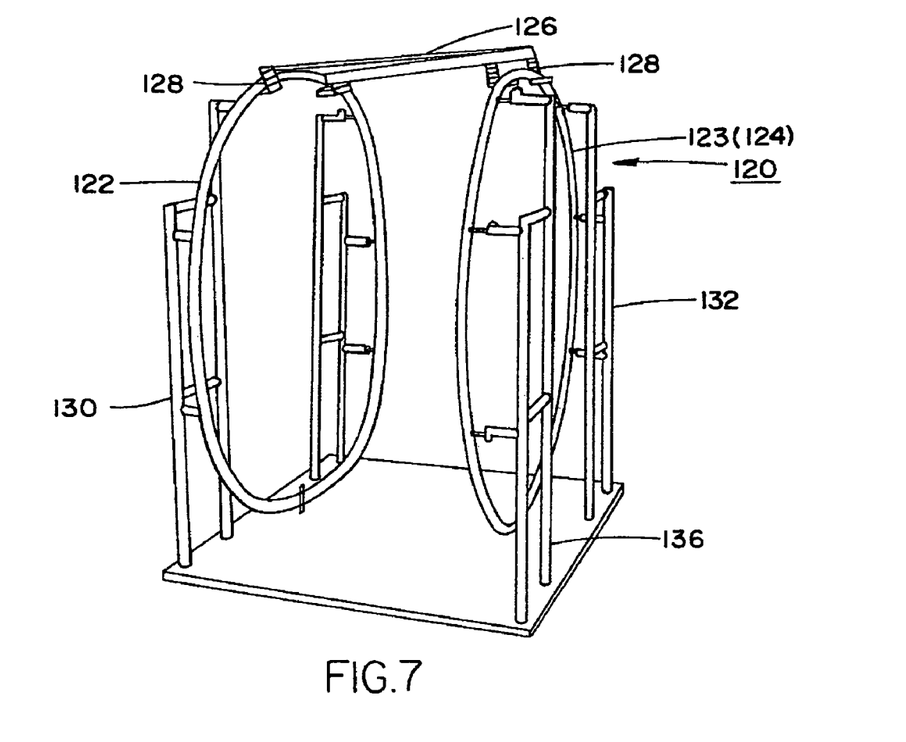
FIG. 7 illustrates, diagrammatically, another embodiment of the invention.

Referring to the embodiment of FIG. 7, there is represented an LWPEG arrangement 120 possessing two widely spaced apart, parallel extending track loops 122 and 123, which define a generally oval travel path for blades 126 (of which only one is shown). The blades 126, a plurality of which are spaced apart, have their opposite ends provided with suitable linear generators 128 so as to be able to slide along the tracks 122, 124 and produce electromagnetic energy for conversion into usable electric power.

The track loops 122, 124 are shown as being generally upright and have support framework 130, 132 for maintaining them supported on a platform 136. The platform 136 may be a turntable which can be supported on a ground frame (not shown).

As disclosed in drawing FIG. 8 through 21(*c*), there are represented various configurations for LWPEG installations.

Figure 8:
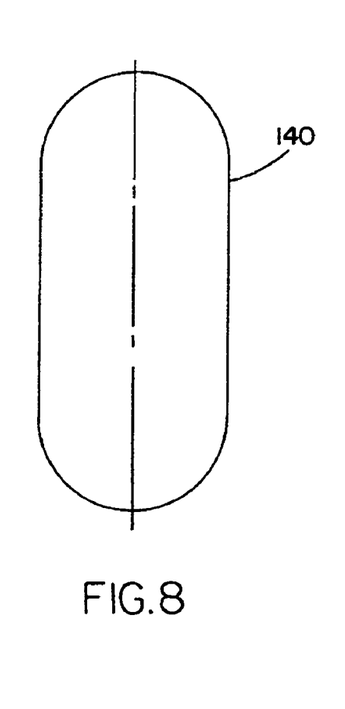
FIG. 8 illustrates a schematic view of a track path for the blades pursuant to the invention.
Figure 9:
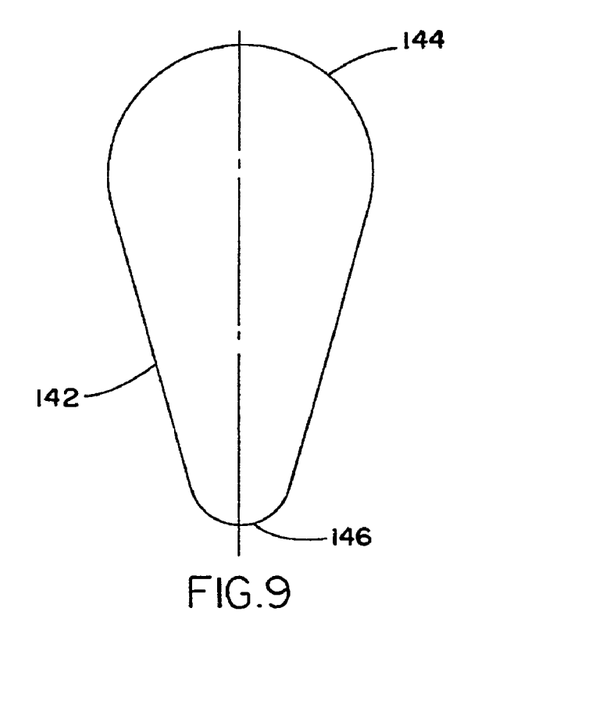
FIG. 9 illustrates another track path for the blades.

FIG. 8 illustrates a schematic representation of an oval track 140 for blades, shown on a vertical plane. FIG. 9 discloses an essentially inverted teardrop shaped track 142 with large upper radius 144 and smaller bottom radius 146. This shape may enable a varying blade speed for maximum power extraction and almost constant blade loading, and possibly facilitate an automatic operating start.

Figure 10:
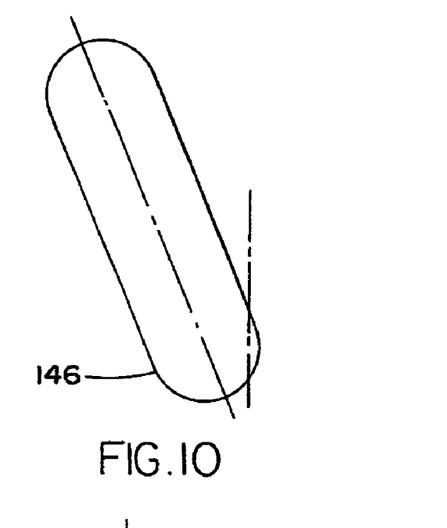
FIG. 10 illustrates another track path for the blades.
Figure 11:
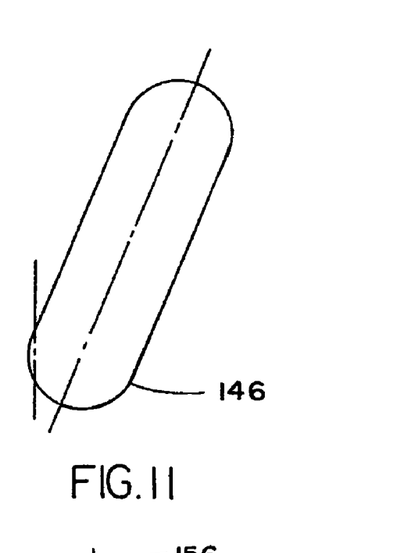
FIG. 11 illustrates another track path for the blades.

FIG. 10 shows an oval track 146 in a vertical plane but forwardly inclined for possible automatic start and negotiating high wind speeds. This also applies to FIG. 11 wherein the track 148 is inclined backward for essentially similar operating conditions.

Figure 12:
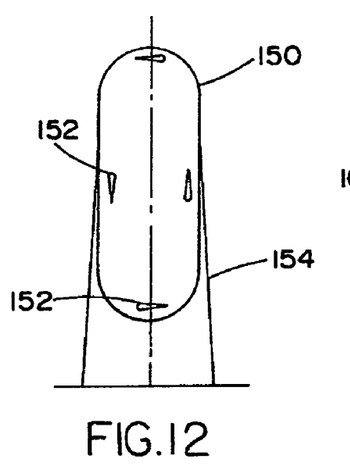
FIG. 12 illustrates another track path for the blades with support system.
Figure 13:
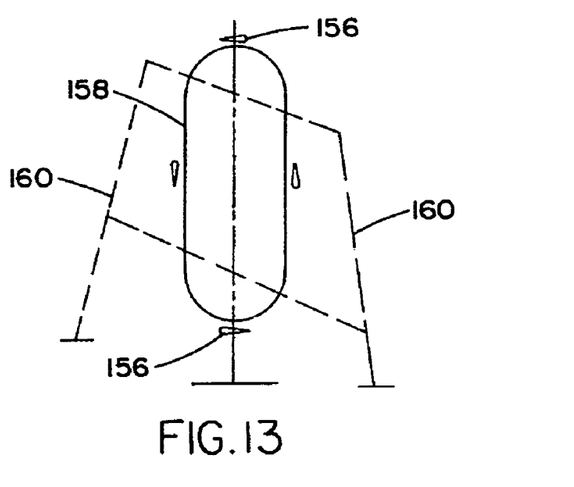
FIG. 13 illustrates another track path for the blades with a modified support system.

FIG. 12 illustrates an oval track 150 oriented in the vertical plane having blades 152 moving within the oval track, and including an external support framework 154. To the contrary, in FIG. 13, the blades 156 more externally of the oval track 158, and the support framework 160 extends from the interior outwardly.

Figure 14:
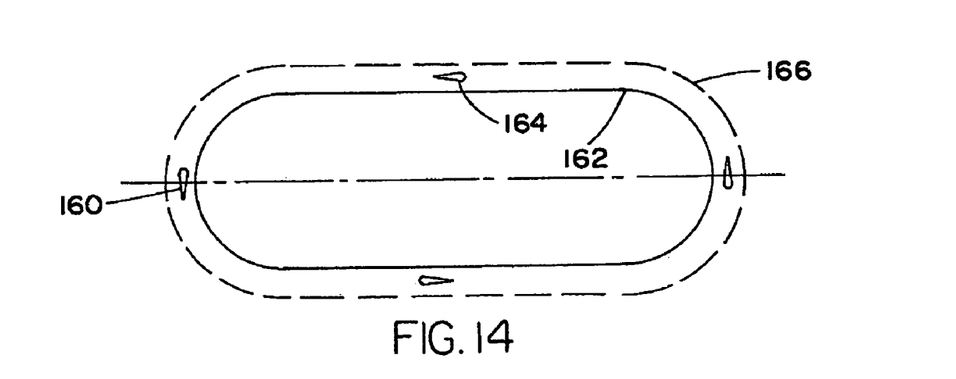
FIGS. 14 and 15 illustrate, respectively, plan and side views of a modified embodiment of path for blades in horizontal plane.
Figure 15:
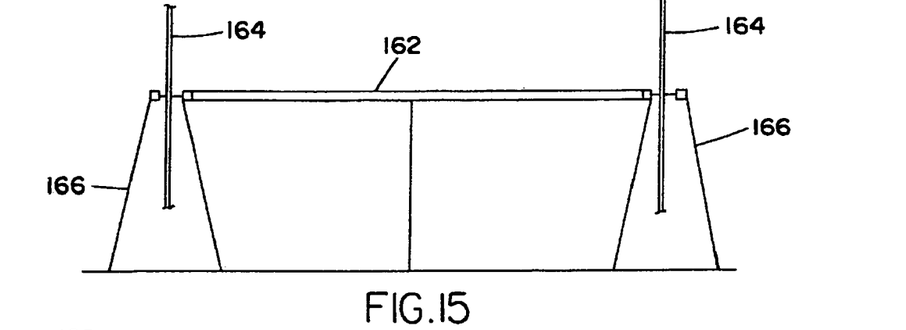

FIGS. 14 and 15 disclose an oval track 162 arranged in a horizontal plane, with blades 164 moving from inside or outside the track; and including a support framework 166 extending from either outside, inside or both sides of the track 162, as may be warranted by particular sites.

Figures 16, 17, 18:
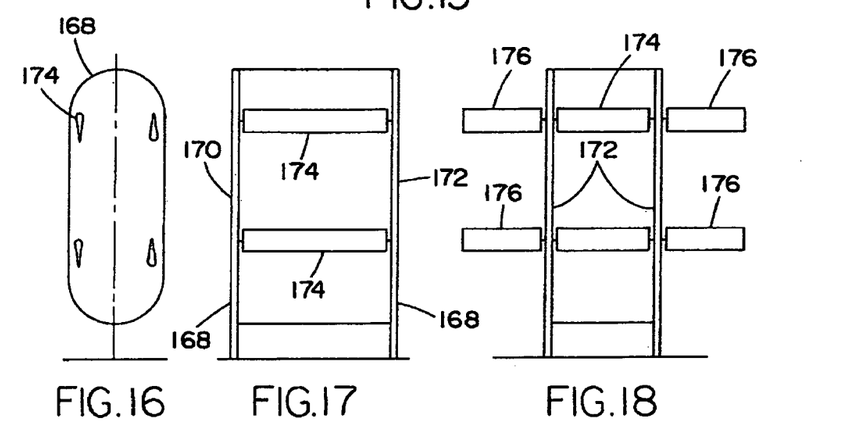

FIGS. 16 and 17 represent side and front views of oval tracks 168 oriented in a vertical plane with two side support frames 170, 172 (somewhat similar to that of FIG. 7); and with blades or vanes 174 connected for linear movement between the tracks 168. FIG. 18 is similar to FIG. 17, but includes further blades 176 extending on either side of track planes of the tracks 168 in a cantilevered configuration.

Figures 19, 20:
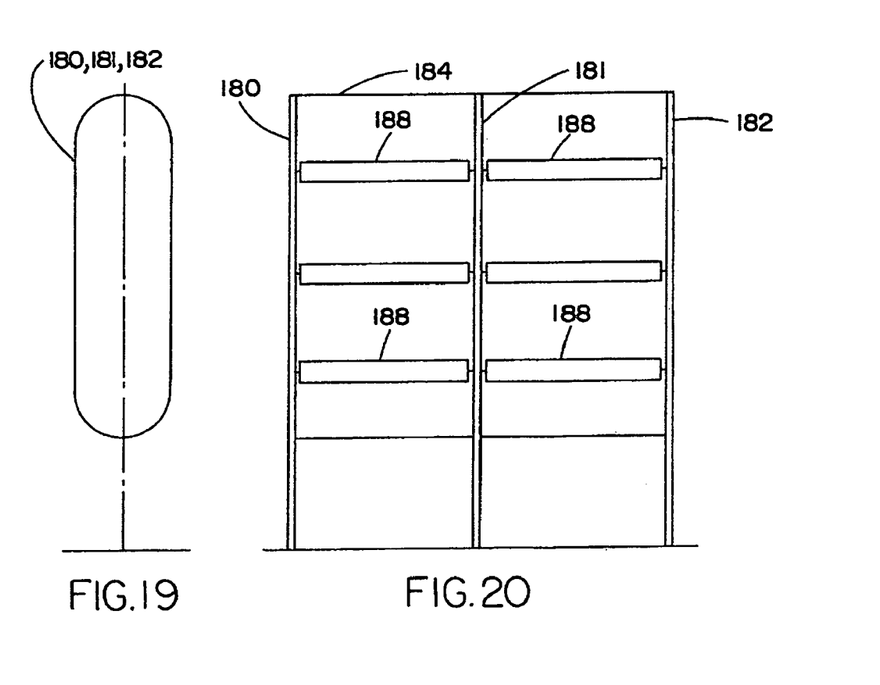
FIGS. 19 and 20 illustrate, respectively, side and front views of a modified embodiment of the invention.

FIGS. 19 and 20 illustrate side and front views of an oval track system, wherein three spaced tracks, 180, 181, 182 are supported in a framework 184 providing for blades or vanes 188 moving within two blade spans, each supported at opposite ends and moving within the tracks in a parallel arrangement.

Figures 21A, 21B:
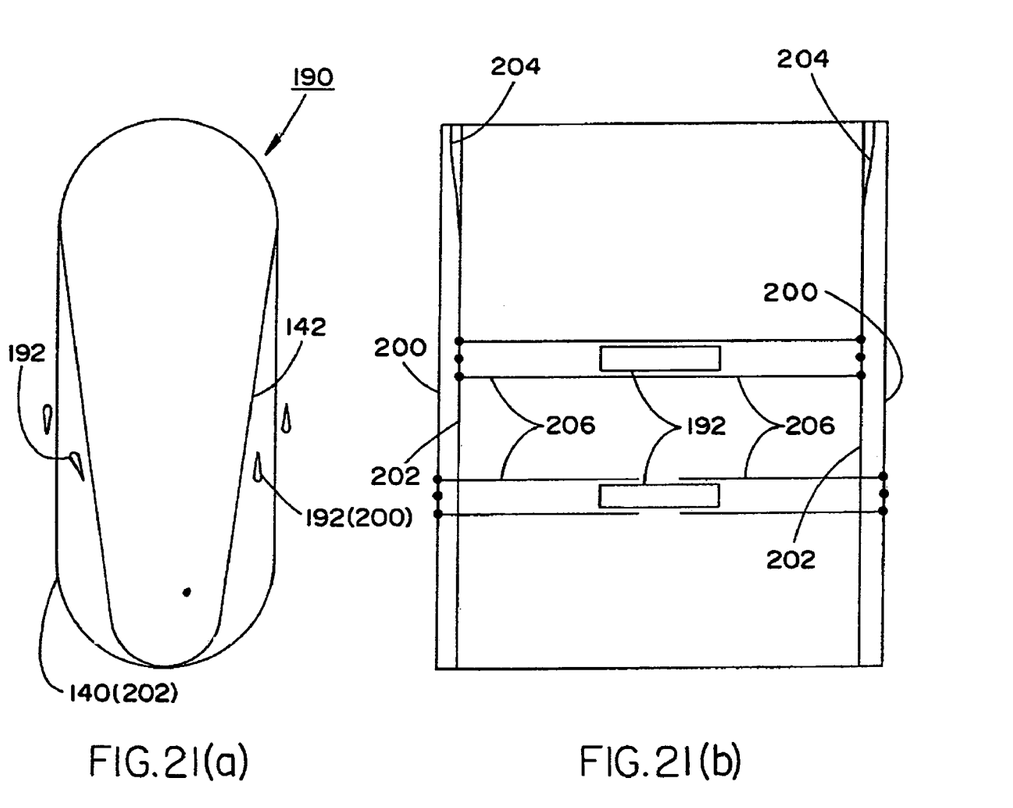
FIGS. 21(a) through 21(c) illustrate, respectively, side, front and bottom plan views of another embodiment of the invention.
Figure 21C:
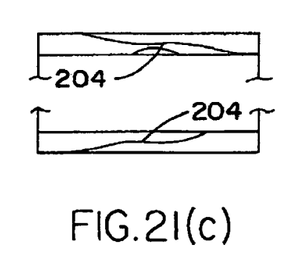

FIGS. 21(*a*) through 21(*c*) disclose two oval track systems 190 combining those of FIGS. 8 and 9 in a vertical plane, with changeover tracks in the top circular section; blades or vanes 192 with adjustable spans and supported on both ends and moving from outside the oval tracks. The blades are mechanically linked by means of preferably adjustable links. At a wind speed below a so-called 'cut in' condition, the blades are brought on the teardrop-shaped oval track 200 into self-starting motion, and after the wind speed becomes greater than a value, the blades or vanes are guided to the symmetrical oval track 202 for maximum energy extraction. The blades are made from adjustable spans, when two outriggers 204 are moved over the central support span 206.

In another embodiment (not shown) the support wheels can be slidably fitted and the outrigger portion of the blades can be folded upward to ensure transition from inner to outer tracks and vice versa.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

What is claimed is:

1. A linear wind-powered electric generator installation, said installation comprising:
   at least two mutually spaced parallel extending closed-loop tracks;
   a supporting frame structure for maintaining said two tracks elevated above ground;
   said at least two closed-loop tracks supporting a plurality of vanes for linear movement along an essentially non-circular orbit in response to a streaming wind impinging against said vanes; and
   electrical power generating means being operatively associated with said vanes whereby said linear movement of said vanes generates an output of electrical energy.

2. An installation as claimed in claim 1, wherein said at least two closed-loop tracks are arranged in selectively vertical or horizontal orientations on said supporting frame structure.

3. An installation as claimed in claim 1, wherein said supporting frame structure is mounted on a turntable arrangement for imparting rotational yaw movement to said at least two closed-loop tracks.

4. An installation as claimed in claim 1, wherein each of said closed-loop tracks mount a plurality of said vanes independently of the vanes mounted on the other of said closed-loop tracks.

5. An installation as claimed in claim 4, wherein said vanes comprise blades having wing tip portions extending from a center which is mounted on said therewith operatively associated closed-loop track.

6. An installation as claimed in claim 1, wherein the plurality of vanes extends between and is operatively connected to said at least two closed-loop tracks.

7. An installation as claimed in claim 1, wherein said vanes are supported on said at least two closed-loop tracks by wing pylons.

8. An installation as claimed in claim 7, wherein said wing pylons are covered with wing pylon covers.

9. An installation as claimed in claim 7, wherein said vanes comprise wing-shaped blades having wing side plates.

10. An installation as claimed in claim 7, wherein said wing pylons include wheel bearing units, which are interconnected selectively mechanically, electrically or mechanically and electrically so as to maintain their positions fixed relative to each other.

11. An installation as claimed in claim 1, wherein said at least two closed-loop tracks comprise guide rails or guiding a wheel assembly connected to each of said vanes.

12. An installation as claimed in claim 11, wherein said wheel assembly comprises a pair of wheels including wheel bearings connected by a wheel axle fitted within said guide rails.

13. An installation as claimed in claim 1, wherein said electrical power generating means comprises, for each of said vanes, a permanent magnet and a rotor element, and for said tracks, a stator coil and core, so as to cooperatively generate power responsive to said linear movement on the vanes along said tracks.

14. An installation as claimed in claim 1, wherein said electrical power generating means comprises, for each of said vanes, a permanent magnet and a rotor element, and for said tracks, a stator coil and core, so as to cooperatively generate power responsive to said linear movement on the vanes along said tracks.

15. An installation as claimed in claim 1, wherein said at least two closed-loop tracks comprise both straight track sections and curved track sections, wherein said vanes are linearly movable along said straight track sections.

16. An installation as claimed in claim 3, wherein said supporting frame structure includes a weathervane for enabling controller means to impart a yaw movement to said at least two closed-loop tracks so as to optimize the effect of streaming wind impacting said vanes in dependence upon the direction of the wind.

17. An installation as claimed in claim 1, wherein there are provided at least three of said closed-loop tracks in parallel spaced relationships with each other, and a plurality of said vanes being connected for linear movement between each of said at least three tracks.

18. An installation as claimed in claim 6, wherein said at least two closed-loop tracks mount further vanes extending outwardly from opposite sides of said tracks.

19. An installation as claimed in claim 17, wherein said further vanes are cantilevered radially outwardly of said tracks substantially coaxially with the plurality of vanes extending between said at least two tracks.

20. An installation as claimed in claim 1, wherein said vanes each possess an essentially airfoil shape in transverse cross-section in conformance with specified dimensions required by said installation.

21. An installation as claimed in claim 1, wherein said orbit is essentially oval.

22. An installation as claimed in claim 20, wherein said oval orbit has straight essentially parallel side sections and convexly rounded end sections connecting with said side sections.

23. An installation as claimed in claim 21, wherein said oval orbit has straight side sections widening towards the upper end thereof, including a large upper convexly rounded end section and a narrower lower convexly rounded end section.

24. An installation as claimed in claim 22, wherein said upwardly widening oval orbit is formed by a further closed-loop track extending with the oval track having straight parallel sides, said tracks being equipped with vanes having adjustable spans and fixed wheels or vanes having foldable outrigger portions with sliding wheels, movable from outside of said oval tracks.

25. An installation as claimed in claim 20, wherein said oval orbit is inclined forwardly within the plane of said at least two tracks.

26. An installation as claimed in claim 20, wherein said oval orbit is inclined rearwardly within the plane of said at least two tracks.

27. An installation as claimed in claim 1, wherein said supporting frame structure supports said tracks from the outsides thereof, and the vanes move within the tracks.

28. An installation as claimed in claim 1, wherein said supporting frame structure supports said tracks from the interior thereof, and the vanes move externally of the tracks.

29. An installation as claimed in claim 1, wherein said supporting frame structure supports said tracks from the outside and interiorly thereof, and said vanes move both externally and interiorly of the orbit defined by said at least two tracks.

30. An installation as claimed in claim 1, wherein said orbit defined by said at least two closed-loop tracks is essentially trapezoidal.

31. An installation as claimed in claim 29, wherein said at least two closed-loop tracks comprise conveyors movably entrained about pulleys at the corners of said trapezoidal orbit, said vanes being connected to said conveyors so as to be movable in conjunction therewith.

* * * * *

UNITED STATES PATENT AND TRADEMARK OFFICE
CERTIFICATE OF CORRECTION

PATENT NO. : 7,709,971 B2  Page 1 of 1
APPLICATION NO. : 12/190970
DATED : May 4, 2010
INVENTOR(S) : Shrikrishna Sane et al.

It is certified that error appears in the above-identified patent and that said Letters Patent is hereby corrected as shown below:

Title page Item (76) should read (76) Inventors: Shrikrishna Sane, 601, Shivneri, IIT Bombay Staff CHSI, Kopri, Powai (IN) 400076; Nirmal Mulye, 10 Erin Ct., Kendal Park, NJ (US) 08824; Vijay Shukla, 184 Cedar La., Apartment A, Highland Park, NJ (US) 08904; Osanan L. Barros Neto, 465 Meadow Rd., Apartment 1102, Princeton, NJ (US) 08540

Signed and Sealed this
Seventeenth Day of May, 2011

David J. Kappos
*Director of the United States Patent and Trademark Office*